United States Patent [19]

Wagner

[11] Patent Number: 5,460,424
[45] Date of Patent: Oct. 24, 1995

[54] REPLACEABLE BACKLITE FOR CONVERTIBLE VEHICLE

[75] Inventor: John J. Wagner, Brighton, Mich.

[73] Assignee: MascoTech Automotive Systems Group, Inc., Auburn Hills, Mich.

[21] Appl. No.: 106,173

[22] Filed: Aug. 13, 1993

[51] Int. Cl.⁶ ............................................. B60J 1/18
[52] U.S. Cl. .................. 296/146.14; 296/107; 296/145; 296/146.15; 49/466; 49/482.1; 49/492.1; 52/127.1; 52/208
[58] Field of Search .................. 296/79, 84.1, 93, 296/96.21, 102, 107, 145, 146.14, 146.15, 147, 148, 201; 49/141, 466, 475.1, 482.1, 492.1; 52/127.1, 208, 397, 400, 716.5, 716.6, 716.7, 718.03, 718.04, 718.06, 204.591, 204.597

[56] References Cited

U.S. PATENT DOCUMENTS

| | | | |
|---|---|---|---|
| 2,189,138 | 2/1940 | Eichner | 296/145 X |
| 2,572,124 | 10/1951 | Eichner | 49/141 |
| 2,583,978 | 1/1952 | Walter et al. | 49/141 |
| 3,090,646 | 5/1963 | Johnson | 296/107 |
| 3,091,494 | 5/1963 | Cohen | 296/107 |
| 4,349,994 | 9/1982 | Maekawa | 52/208 |
| 4,571,278 | 2/1986 | Kunert | 156/108 |
| 4,572,570 | 2/1986 | Trucco | 296/107 |
| 4,611,849 | 9/1986 | Trenkler | 296/201 |
| 4,650,240 | 3/1987 | Rinella | 296/93 |
| 4,683,694 | 8/1987 | Ziegler | 52/208 |
| 4,840,001 | 6/1989 | Kimisawa | 52/208 |
| 4,873,803 | 10/1989 | Rundo | 52/202 |
| 4,950,019 | 8/1990 | Gross | 296/93 |
| 5,044,684 | 9/1991 | Yada | 296/931 |
| 5,062,248 | 11/1991 | Kunert | 52/208 |
| 5,094,498 | 3/1992 | Yada | 296/93 |
| 5,114,206 | 5/1992 | Yada | 296/201 |
| 5,142,834 | 9/1992 | Laclave et al. | 52/208 |
| 5,154,471 | 10/1992 | Mimura et al. | 296/93 |
| 5,271,655 | 12/1993 | Ball et al. | 296/146.14 |

Primary Examiner—Andrew C. Pike
Attorney, Agent, or Firm—Edgar A. Zarins; Malcolm L. Sutherland

[57] ABSTRACT

A replaceable or serviceable window forms a portion of the flexible top of a convertible vehicle. The window includes a flexible transparent material which forms the window and a flexible channel retainer which detachably secures the transparent material to the flexible top material. The channel retainer includes a backing member having a longitudinal channel and a locking molding which is lockingly received by the backing member. In a preferred embodiment, the backing member is dielectrically bonded to the transport window material and insertion of the molding sandwiches the top material into the channel retainer. The flexible nature of the window and channel retainer allows the convertible top to be folded into a more compact top stack for storage on the vehicle.

8 Claims, 1 Drawing Sheet

REPLACEABLE BACKLITE FOR CONVERTIBLE VEHICLE

BACKGROUND OF THE INVENTION

I. Field of the Invention

This invention relates to a window for a top of a convertible vehicle and, in particular, to a replaceable window for a convertible vehicle which has sufficient flexibility to facilitate efficient folding and storage of the convertible top.

II. Description of the Prior Art

In order to provide proper visibility in a convertible vehicle, at least one window which forms a part of the convertible top is necessary. However, the typical convertible top fixedly mounts the window within an opening in the top. Depending upon the flexibility of the material used, the window material may be sewn, glued, or otherwise bonded directly to the top material. Still other constructions utilize a rigid window pane secured to the top material using a molding member. The disadvantage of such constructions becomes apparent when the window requires replacement because of a tear, breakage, discoloration, or other deformation. In many instances, a whole new top is required because the window cannot be separated from the top material nor easily replaced.

SUMMARY OF THE PRESENT INVENTION

The present invention overcomes the disadvantages of the prior known window systems for a vehicle convertible top by providing a flexible retainer for removably maintaining the backlite which allows compact storage of the top yet simple replacement of the backlite window.

The window system for a convertible top of the present invention includes a clear vinyl sheet which forms the window with a flexible U-channel dielectrically bonded along the edges of the vinyl material. As a result, the retainer channel is carried by the window material yet maintaining the flexibility to fold into the rear boot of the vehicle. An opening corresponding to the dimensions of the window is formed in the top material. The vinyl top material along the edge of this opening is inserted into the U-channel bonded to the window material. A flexible molding member is lockingly inserted into the U-channel to capture the top material within the retainer thereby connecting the window to the vinyl top. The molding member provides a neat exterior appearance while hiding the seam between the window and top material. In the event the window needs replacing, the molding is pulled from the U-channel allowing separation of the window from the top. Thereafter a new window may be conveniently inserted.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
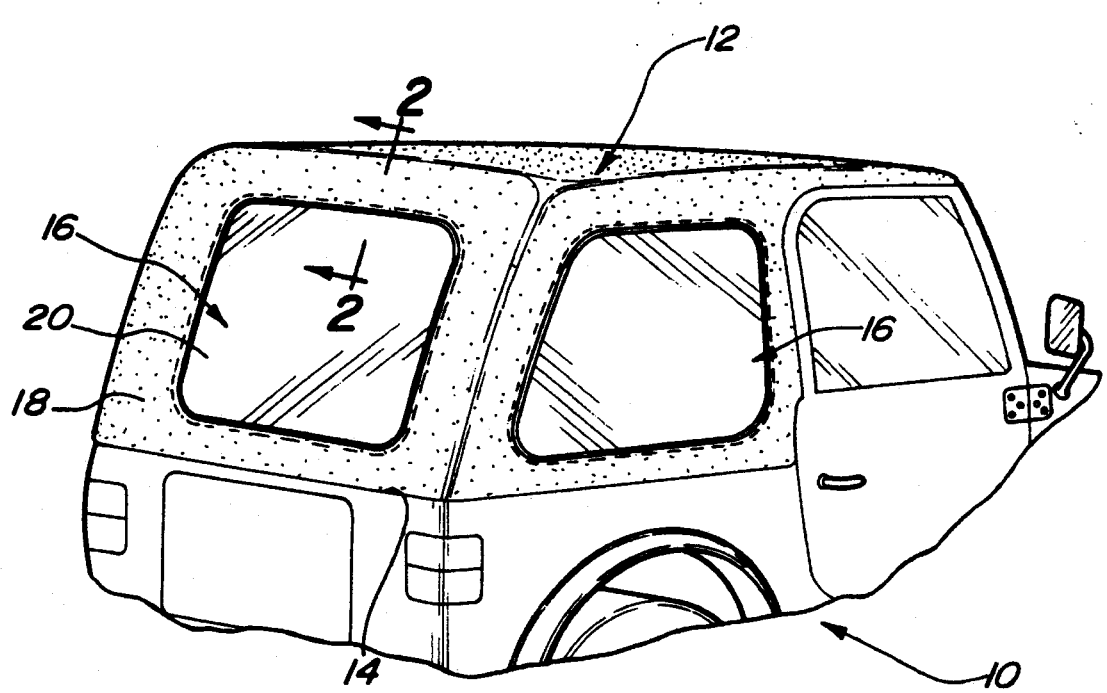
FIG. 1 is a partial perspective view of a vehicle with selectively convertible top incorporating a window system embodying the present invention.

Referring first to FIG. 1, there is shown a vehicle 10 commonly referred to as a convertible with a top 12 selectively movable between a closed position as shown and an open position whereby the top 12 is folded and stored in the rear portion of the vehicle 10. The top 12 may be folded and retained along the upper edge 14 of the vehicle body or in a storage compartment or boot formed in the vehicle 10. In either instance, it is desirable to minimize the size or top stack height of the folded top 12. For purposes of visibility, the top 12 includes one or more windows 16 which must be stored along with the top 12. In the lexicon of the industry, the rear window is referred to as a backlite.

Figure 2:
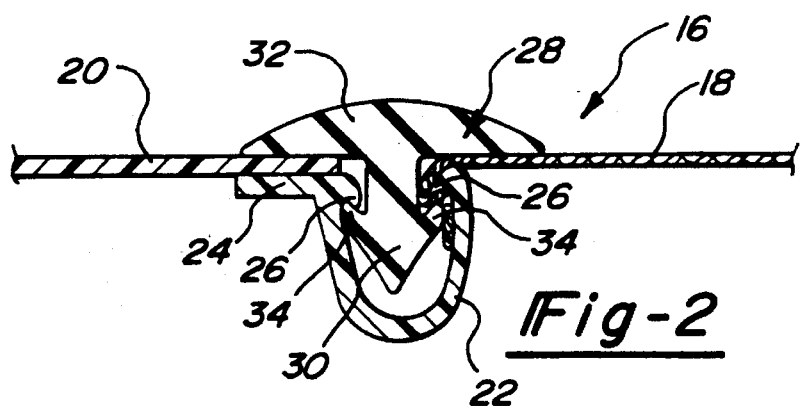
FIG. 2 is a cross-sectional view of a first embodiment of the system for removably retaining a window of the convertible vehicle taken along lines 2—2 of FIG 1.

Referring now to FIG. 2 which shows a first embodiment of the present invention, the top 12 having a backlite 16 generally comprises a vinyl top material 18 with a clear vinyl window material 20 positioned within appropriate openings or parts in the top material 18. The present invention provides means for selectively removing, servicing, and replacing the backlite 16 without damaging the top 12. A flexible channel member 22 is dielectrically bonded along the peripheral edge of the window material 20 as to be carried therewith. The channel member 22 has a substantially U-shaped configuration with a perpendicular flange 24 for bonding the member 22 to the window material 20. Formed at the opening to the channel member 22 are downwardly depending locking tabs 26. The channel member 22 must have sufficient flexibility to allow the window and top to be efficiently folded into the rear of the vehicle 10.

In order to secure the backlite 16 into the top 12, a retainer molding strip 28 is utilized to capture the edge of the vinyl top material 18 within the channel member 22. The flexible retainer molding 28 includes a longitudinal prong 30 extending the length of the molding 28 and an integral cap 32 which conceals and seals the seam between the window and top material. The prong 30 includes locking tabs 34 which are directed in opposition to the locking tabs 26 of the channel member 22 such that upon insertion of the molding 28 into the channel member 22 the tabs 34 and 26 lockingly engage. The top material 18 inserted into the channel member 22 is lockingly retained by the tabs 26 and 34.

Figure 3:
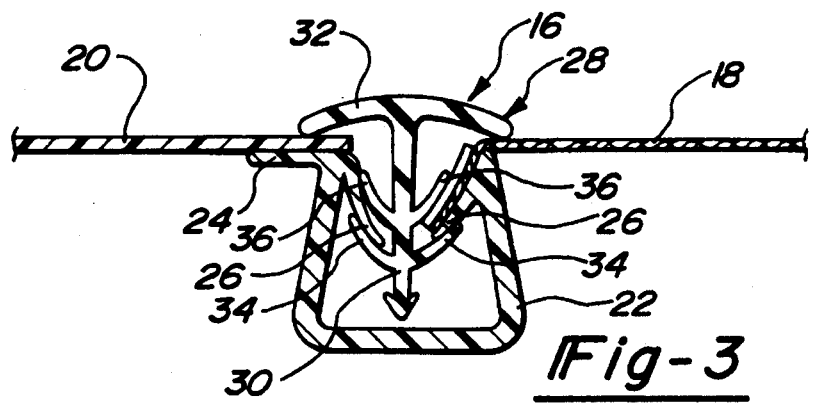
FIG. 3 is a cross-sectional view of a second embodiment of the system for removably retaining a window of the convertible vehicle.

FIG. 3 shows a second embodiment of the retaining system of the present invention. In this embodiment, the molding member 28 includes a second set of tabs 36 on the center prong 30 which seals against the exterior side of the vinyl top material 18.

Insertion of a flexible window 16 within a convertible top 12 is simplified by the present invention. With the opening in the top material 18 cut to the size of the backlite 20, the channel member 22 is bonded along the edge of the window material 20 such that the channel extends beyond the edge. The edge of the top material 18 forming the opening is inserted into the channel member 22 along its entire length. Thereafter, the prong 30 of the retainer molding 28 is inserted into the channel 22 until the locking tabs 26 and 34 engage capturing the top material 18 within the retainer channel 22. The cap 32 of the molding 28 spans the seam between the window material 20 and top material 18 preventing moisture from penetrating the vehicle 10. The flexible properties of the channel 22 and molding 28 facilitate folding into storage along with the top 12. In the event the window 16 requires replacement, the molding 28 can be pried from the channel 22 with a simple tool.

The foregoing detailed description has been given for clearness of understanding only and no unnecessary limitations should be understood therefrom as some modifications will be obvious to those skilled in the art without departing from the scope and spirit of the appended claims.

What is claimed is:

1. A serviceable backlite removably mounted within an opening of a convertible vehicle top, the opening substantially corresponding to a configuration of said backlite, said backlite and said vehicle top being selectively foldable within a storage compartment of a vehicle, said backlite comprising:

a flexible window material having a configuration substantially corresponding to the opening in the vehicle top, said window material having a peripheral edge; and a flexible retainer molding secured to said peripheral edge of said window material, wherein said flexible retainer molding includes a channel member secured to said peripheral edge of said window material and a molding member lockingly received by said channel member to removably secure said backlite within the opening in the vehicle top, said molding member including an elongated cap having an elongated prong depending from an underside of said cap, said prong being lockingly received within said channel member such that said retainer molding selectively captures an edge of the vehicle top circumscribing the opening in the vehicle top to removably mount said backlite within the opening whereby said backlite and said vehicle top are selectively foldable into the storage compartment of the vehicle.

2. The backlite as defined in claim 1 wherein said channel member is bonded to said window material along said peripheral edge so as to be carried with said window material.

3. The backlite as defined in claim 1 wherein said channel member includes an elongated channel portion having longitudinal side walls and a mounting flange extending outwardly from one of said side walls of said elongated channel portion, said mounting flange being secured to said window material.

4. The backlite as defined in claim 3 wherein said channel portion includes locking tabs extending inwardly from said side walls.

5. The backlite as defined in claim 4 wherein said prong has locking tabs selectively lockingly engageable with said locking tabs of said channel member upon mating insertion of said prong into said channel portion whereby the edge of the vehicle top is captured within said channel member by said molding member to secure said backlite to the vehicle top.

6. A serviceable backlite removably mounted within an opening of a convertible vehicle top, the opening substantially corresponding to a configuration of said backlite and having an edge of top material circumscribing the opening, said backlite and said vehicle top being selectively foldable within a storage compartment of a vehicle, said backlite comprising:

a flexible window material having a configuration substantially corresponding to the opening in the vehicle top, said window material having a peripheral edge; and a flexible retainer molding selectively capturing the edge of said top material of the top opening to removably mount said backlite within the opening wherein said backlite and said vehicle top are selectively foldable into the storage compartment of the vehicle, said retainer molding including:

a channel member having a channel portion defined by a pair of longitudinal side walls and a mounting flange extending outwardly from one of said side walls of said channel portion, said mounting flange being bonded to said window material along said peripheral edge to secure said channel member to said window material; and a molding member having an elongated cap with a longitudinal prong depending from an underside of said cap, said prong lockingly engaging said channel portion to capture the edge of said top material of the top opening thereby removably mounting said backlite within the vehicle top.

7. The backlite as defined in claim 6 wherein said mounting flange is dielectrically bonded to said window material thereby carrying said channel member along with said window material.

8. The backlite as defined in claim 6 wherein said channel portion includes interior locking tabs and said prong includes exterior locking tabs such that said locking tabs lockingly engage upon insertion of said prong into said channel member.

* * * * *